United States Patent
Amimori et al.

(10) Patent No.: US 7,063,872 B1
(45) Date of Patent: *Jun. 20, 2006

(54) FILMS HAVING A HIGH TRANSMITTANCE AND MATT PROPERTY

(75) Inventors: Ichiro Amimori, Minami-ashigara (JP); Hiroshi Inoue, Hadano (JP); Hidetoshi Watanabe, Minami-ashigara (JP)

(73) Assignee: Fuji Photo Co., Ltd., Minami-Ashigara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/890,563

(22) PCT Filed: Feb. 4, 2000

(86) PCT No.: PCT/JP00/00622

§ 371 (c)(1),
(2), (4) Date: Aug. 2, 2001

(87) PCT Pub. No.: WO00/46617

PCT Pub. Date: Aug. 10, 2000

(30) Foreign Application Priority Data

| Feb. 5, 1999 | (JP) | 11-029322 |
| Feb. 5, 1999 | (JP) | 11-029381 |
| Mar. 12, 1999 | (JP) | 11-067444 |

(51) Int. Cl.
  G02F 1/1333 (2006.01)
  G03B 21/60 (2006.01)

(52) U.S. Cl. ............... 428/1.1; 428/1.3; 428/1.31; 428/1.5; 427/163.4; 359/541; 359/452; 359/455; 353/32

(58) Field of Classification Search ............... 428/1.1, 428/1.3, 1.31, 1.5; 427/163.4, 137; 359/540, 359/541, 455–456, 452–453; 353/32
See application file for complete search history.

(56) References Cited

U.S. PATENT DOCUMENTS

| 2,354,049 A | * | 7/1944 | Palmquist | 40/615 |
| 2,407,680 A | * | 9/1946 | Palmquist et al. | 359/538 |
| 3,025,764 A | * | 3/1962 | McKenzie | 359/541 |
| 3,614,199 A | * | 10/1971 | Altman | 359/540 |
| 3,700,478 A | * | 10/1972 | Bingham | 359/541 |
| 4,963,624 A | * | 10/1990 | Ida et al. | 525/309 |
| 5,389,422 A | * | 2/1995 | Okazaki et al. | 428/141 |
| 5,747,152 A | * | 5/1998 | Oka et al. | 428/323 |
| 5,783,283 A | * | 7/1998 | Klein et al. | 428/141 |

(Continued)

FOREIGN PATENT DOCUMENTS

JP 07-218705 8/1995

(Continued)

*Primary Examiner*—Harold Pyon
*Assistant Examiner*—Sow-Fun Hon
(74) *Attorney, Agent, or Firm*—Buchanan Ingersoll PC

(57) ABSTRACT

A film having a high transmittance and matt property is disclosed which has, on a transparent support 1, a hard coat layer 2 incorporated therein particles 4 of a particle size of 1.0 to 10 μm that is larger than the layer thickness thereof, and a low-refractive-index layer 3 having a refractive index of 1.45 or less and covering said hard coat layer, wherein a haze value is 1.0% or more, and a total transmittance of light is 93.5% or more. The film having a high transmittance can prevent occurrence of unevenness of display due to thermal expansion of a light-tuning film and occurrence of unevenness of brightness peculiar to the light-tuning film.

11 Claims, 1 Drawing Sheet

U.S. PATENT DOCUMENTS

| | | | |
|---|---|---|---|
| 5,909,314 A * | 6/1999 | Oka et al. | 359/582 |
| 6,268,961 B1 * | 7/2001 | Nevitt et al. | 359/488 |
| 6,344,263 B1 * | 2/2002 | Moshrefzadeh et al. | 428/206 |
| 6,559,915 B1 * | 5/2003 | Amimori et al. | 349/112 |
| 6,977,696 B1 * | 12/2005 | Amimori et al. | 349/112 |

FOREIGN PATENT DOCUMENTS

| | | |
|---|---|---|
| JP | 08-220310 | 8/1996 |
| JP | 10-239504 | 9/1998 |
| JP | 10-240143 | 9/1998 |

* cited by examiner

FILMS HAVING A HIGH TRANSMITTANCE AND MATT PROPERTY

This application is a 371 of PCT/JP00/00622 filed Feb. 4, 2000.

TECHNICAL FIELD

The present invention relates to a film having a high transmittance and matt property, a polarizing plate, and an image display device using the same as a component member thereof.

BACKGROUND ART

An example of the construction of a conventional liquid crystal display device is shown in FIG. 2. FIG. 2 shows a diagrammatic side view of an ordinary liquid crystal display device that is composed of, as shown in the figure, a backlight 11 of an edge light type on the furthest back surface and, in the order from the furthest back surface, a light introductive plate 12 for injecting light from the back light toward the surface, a scattering sheet 13 for uniformly dispersing brightness of the light, and one or plural light-tuning sheet (light tuning film) 14 having a function for condensing the uniformly dispersed light by the scattering sheet to a given direction or alternatively a function for selectively transmitting or reflecting a specific polarized light. Light passing through these films is injected to a liquid crystal cell 17 interposed between a pair of polarizing plates 15 and 16. In the figure, 18 denotes a cooled cathode fluorescent tube as light source and 19 a reflective sheet.

In the liquid crystal display device, usually the light tuning film 14 and the backside polarizing plate 15 located on the side of the liquid crystal cell are especially not bonded with a binder or the like so that a slight gap exists between both. This light tuning film 14 is made of an acrylic resin, a polyester, a polycarbonate or the like, but these materials are rather larger in stretching or shrinking caused by change in temperature so that the light tuning film 14 elongated by heating due to ambient circumstance, backlight or the like is brought into contact with the backside polarizing plate 15 to cause non-uniformity in display in circumferential areas of image. In some of the light tuning films, there exists a unique brightness non-uniformity, thus bringing about deterioration in their display quality. With regard to the above-mentioned light-tuning film, JP-A-10-240143 ("JP-A" means unexamined published Japanese patent application) describes that an irregularity (concavo-convex structure) that is formed by transparent particles on the surface of the light-tuning film prevents deterioration of the display quality when dew condensation occurs in the gap between a light-tuning film and a backside polarizing plate, and consequently they adsorb each other via dew droplets.

However, the polarizing plate still fails to prevent unevenness of the display that occurs when the polarizing plate contacts a light-tuning film due to thermal expansion, and unevenness of the brightness that is peculiar to the light-tuning film. Further, the polarizing plate has a disadvantage of reducing transmittance of the back light. To prevent unevenness of the brightness of the light-tuning film, it is conventionally proposed to use another scattering film between the light-tuning film and a liquid crystal cell. Generally, however, since the scattering film has a haze, the transmittance tends to be lowered. Accordingly, it is difficult to avoid the possibility that reduction in brightness of the display may be caused by giving matt property thereto.

Accordingly, an object of the present invention is to provide a film having a high transmittance that is able to prevent occurrence of both unevenness of the display due to thermal expansion of the light-tuning film, and unevenness of the brightness that is peculiar to the light-tuning film, as mentioned above. Another object of the present invention is to provide a polarizing plate using a film having a high transmittance that has improved such existing disadvantages. Still another object of the present invention is to provide a liquid crystal display device to which a stable high quality of display is given by using the film having a high transmittance or the polarizing plate.

Other and further objects, features, and advantages of the invention will appear more fully from the following description, taken in connection with the accompanying drawings.

DISCLOSURE OF THE INVENTION

Figure 1:
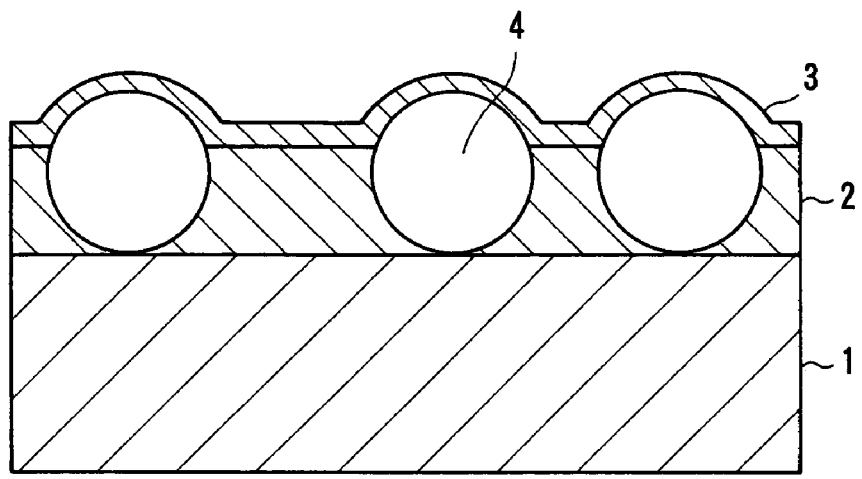
FIG. 1 is a sectional view schematically illustrating the layer constitution of a film having a high transmittance and matt property.

The objects of the present invention have been attained by the following means.

(1) A film having a high transmittance and matt property, comprising, on a transparent support, a hard coat layer incorporated therein particles of a particle size of 1.0 to 10 μm that is larger than the thickness of the hard coat layer, and a low-refractive-index layer having a refractive index of 1.45 or less and covering said hard coat layer, wherein the film has a haze value of 1.0% or more, and a total transmittance of light of 93.5% or more.

(2) The film having a high transmittance and matt property according to the above (1), wherein said low-refractive-index layer is formed by incorporating therein a fluorine-containing macromolecular compound being cross-linked by heat or ionization radiation, and has a coefficient of kinetic friction of 0.2 or less.

(3) The film having a high transmittance and matt property according to the above (1), wherein said hard coat layer contains a cross-linked binder polymer, and monodispersed transparent fine particles having an average particle size larger than the average thickness of the hard coat layer and having a particle size distribution of 0.2 or less in terms of coefficient of variation.

(4) The film having a high transmittance and matt property according to the above (1), wherein said hard coat layer contains a cross-linked binder polymer, and monodispersed transparent fine particles composed of a resin having a Moh's scale of hardness of less than 7, which have an average particle size larger than the average thickness of the hard coat layer and which have a particle size distribution of 0.2 or less in terms of coefficient of variation, and wherein said low-refractive-index layer is composed of a fluorine-containing compound being cross-linked with a refractive index of 1.45 or less and a coefficient of kinetic friction of 0.15 or less.

(5) The film having a high transmittance and matt property according to the above (3), wherein the low-refractive-index layer is formed by incorporating therein a fluorine-containing macromolecular compound being cross-linked by heat or ionization radiation, and has a coefficient of kinetic friction of 0.2 or less.

(6) The film having a high transmittance and matt property according to the above (5), wherein said hard coat layer contains a cross-linked binder polymer, and monodispersed transparent fine particles composed of a resin having a Moh's scale of hardness of less than 7, which have an average particle size larger than the average thickness of the hard coat layer and which have a particle size distribution of 0.2 or less in terms of coefficient of variation, and wherein said low-refractive-index layer is composed of a fluorine-containing compound being cross-linked with a refractive index of 1.45 or less and a coefficient of kinetic friction of 0.15 or less.

(7) The film having a high transmittance and matt property according to the above (1), wherein said film having a high transmittance and matt property is an optical film comprising, on a transparent support, a hard coat layer and a low-refractive-index layer having a lower refractive index than that of said transparent support, laminated in this order, and wherein said hard coat layer contains a cross-linked binder polymer, and monodispersed transparent fine particles having an average particle size larger than the average thickness of the hard coat layer and having a particle size distribution of 0.1 or less in terms of coefficient of variation.

(8) A polarizing plate having a high transmittance and matt property, comprising a polarizing layer and two protective films thereon, wherein at least one of the protective films is the film having a high transmittance and matt property according to any one of the above (1) to (7), and wherein a matted layer is disposed at the opposite side to the polarizing layer.

(9) A liquid crystal display device, using the film having a high transmittance and matt property according to any one of the above (1) to (7).

(10) A liquid crystal display device, comprising two polarizing plates provided on both sides of a liquid crystal cell, wherein the polarizing plate provided at the backlight side is the polarizing plate having a high transmittance and matt property according to the above (8), the matted layer being disposed toward the backlight side.

By the term "matt property" referred to herein is meant a performance that a concavo-convex structure is formed on the surface and non-uniformity due to interference is not generated when brought into contact with a smooth surface. Haze rate is preferably 1.0 to 10.0%, more preferably 2.0 to 6.0%.

BEST MODE FOR CARRYING OUT THE INVENTION

Preferable embodiments of the film having a high transmittance and matt property of the present invention, and the polarizing plate or the liquid crystal display device using the same, are explained below with reference to figures, as the occasion may demands.

FIG. 1 is a schematic cross sectional view showing the layer construction of the film having a high transmittance and matt property. The film having a high transmittance and matt property has a layer construction in the written order of a transparent support 1, a hard coat layer 2 and a layer having a low refractive index 3. The hard coat layer contains particles 4 having a particle diameter of 1.0 to 10 µm, which particles form a concavo-convex structure on the surface and impart haze to the film. The particles 4 in the hardcoat layer has a particle diameter preferably 1.0 to 10 µm, more preferably 3 to 10 µm. For a low-refractive-index layer, generally use can be made of a fluorine-containing resin film, a sol-gel film, a laminated film of fine particles having a particle diameter of 200 nm or less, a vapor-deposited silicon dioxide film, each having a refractive index of 1.45 or less, preferably 1.40 or less. The refractive index and film thickness of the layer is preferably to satisfy the following formula (I):

$$m\lambda/4 \times 0.7 < n_1 d_1 < m\lambda/4 \times 1.3 \qquad (I)$$

wherein m is a positive odd number (generally 1), $\lambda$ represents a wavelength of light, $n_1$ represents a refractive index of the low-refractive-index layer, and $d_1$ represents a film thickness (nm) of the low-refractive-index layer.

As is apparent from FIG. 1, the particle 4 is preferably larger in particle diameter than the layer thickness of the hard coat layer 2.

It is preferable to use a plastic film as the transparent support. Examples of materials for the plastic film include a cellulose ester (for example, triacetyl cellulose, diacetyl cellulose, propionyl cellulose, butyryl cellulose, acetyl propionyl cellulose and nitrocellulose), a polyamide, a polycarbonate, a polyester (for example, polyethylene terephthalate, polyethylene naphthalate, poly-1,4-cyclohexanedimethylene terephthalate, polyethylene-1,2-diphenoxyethane-4,4'-dicarboxylate and polybutylene terephthalate), a polystyrene (for example, syndiotactic polystyrene), a polyolefin (for example, polypropylene, polyethylene or polymethylpentene), a polysulfone, a polyethersulfone, a polyarylate, a polyether imide, a polymethyl methacrylate, and a polyether ketone. It is preferable to use triacetyl cellulose, a polycarbonate and polyethylene terephthalate. The transparent support preferably has a light transmittance of 80% or more, more preferably 86% or more. Haze of the transparent support is preferably 2.0% or less, more preferably 1.0% or less. A refractive index of the transparent support is preferably 1.40 to 1.70.

It is preferable to use a polymer having a saturated hydrocarbon or polyether as a main chain thereof as a compound for use in the hard coat layer. More preferable is a polymer having a saturated hydrocarbon as a main chain. The polymeric binder (binder polymer) is preferably crosslinked. The polymer having a saturated hydrocarbon as a main chain thereof is preferably obtained by polymerization reaction of an ethylenically unsaturated monomer. For obtaining a crosslinked polymeric binder, it is preferable to use a monomer having at least two ethylenically unsaturated groups.

Examples of the monomer having at least two ethylenically unsaturated groups include an ester of a polyhydric alcohol and (meth)acrylic acid (for example, ethyleneglycol di(meth)acrylate, 1,4-cyclohexanediol diacrylate, pentaerithritol tetra(meth)acrylate), pentaerithritol tri(meth)acrylate, trimethylolpropane tri(meth)acrylate, trimethylolethane tri(meth)acrylate, dipentaerithritol tetra(meth)acrylate, dipentaerithritol penta(meth)acrylate, pentaerithritol hexa (meth)acrylate, 1,2,3-cyclohexane tetramethacrylate, polyurethane polyacrylate and polyester polyacrylate), vinylbenzene and a derivative thereof (for example, 1,4-divinylbenzene, 4-vinylbenzoic acid-2-acryloylethyl ester, and 1,4-divinylcyclohexanone), a vinylsulfone (for example, divinylsulfone), and an acrylamide (for example, methylene-bis-acrylamide) and a methacrylamide.

A polymer containing a polyether as a main chain thereof is preferably synthesized by ring-opening polymerization of a polyfunctional epoxy compound.

These monomers having ethylenically usaturated groups have to be cured by polymerization due to ionizing radiation or heat after application onto the film.

In place of or in addition to the monomer having at least two ethylenically unsaturated groups, a crosslinked structure may be introduced into the polymeric binder by the reaction of a crosslinkable group. Examples of the crosslinkable functional group include isocyanate group, epoxy group, aziridine group, oxazoline group, aldehyde group, carbonyl group, hydrazine group, carboxyl group, methylol group, and active methylene group. Vinylsulfonic acid, an acid anhydride, a cyanoacrylate derivative, melamine, etherified methylol, an ester, a urethane and a metal alkoxide such as tetramethoxysilane can also be utilized as a monomer for introducing a crosslinking structure. A functional group exhibiting crosslinking property as a result of a decomposition reaction such as a blocked isocyanate group may also be used. The term "crosslinkable group" referred to herein means a group exhibiting reactivity as a result of decomposition of the functional group mentioned above and is not limited to the aforesaid compounds.

Compounds having such a crosslinkable group have to be crosslinked by heat or the like after applied onto a film.

Examples of the matt particles to be incorporated into the hard coat layer include fine particles of inorganic substances such as silicon dioxide, titanium dioxide, magnesium oxide, calcium carbonate, magnesium carbonate, barium sulfate, and strontium sulfate, and fine particles of organic substances such as poly(methyl acrylate), poly(methyl methacrylate), polyacrylonitrile, polystyrene, cellulose acetate, cellulose acetate propionate. Among them, preferred are silicon dioxide as the inorganic substance, while polymethyl methacrylate as the organic substance.

The matt particles to be incorporated into the hardcoat layer are preferably composed of a resin having a Moh's hardness of less than 7. Examples of the resin include poly(methyl methacrylate) resins, fluororesins, vinylidene fluoride resins, silicone resins, epoxy resins, nylon resins, polystyrene resins, phenol resins, polyurethane resins, crosslinked acrylic resins, crosslinked polystyrene resins. The matt particles are preferably insoluble in water and organic solvents.

The matt particles preferably have a size of an average particle diameter of 1 to 10 μm, more preferably 3 to 10 μm, and especially preferably 3 to 7 μm. A particle diameter distribution of the particles has preferably a variation coefficient of 0.2 or less, and the particles having a high monodispersibility and a variation coefficient of 0.1 or less are especially preferable. When the coefficient of variation is so large that the particle size distribution is too wide, sometimes matt property is not enough.

By the term "variation coefficient" referred to herein is defined a value obtained according to the following formula (II):

$$\sqrt{\frac{\sum(\bar{r}-ri)^2 \cdot ni}{\sum ni}} \div \bar{r} \tag{II}$$

wherein $\bar{r}$ represents a number average particle diameter, ni represents a particle of ordinal i number, and ri represents the particle diameter of a particle of ordinal i number.

In case the particles of matt property are to be incorporated into the hard coat layer, it is preferable to use a combination of an average particle diameter of the particles of matt property being larger by 0.5 to 5.0 μm than the thickness of the hard coat layer. Especially preferable combination is an average particle diameter larger by 1 to 3 μm than the thickness.

As the fine particles to be incorporated into the hard coat layer, two or more of the particles may be used in combination to adjust haze. The particles equal to or smaller than the thickness of the hard coat layer are not included in the particles of matt property.

The density of the coated particles of matt property depends on the degree of haze, but preferably it is within the range of 100 to 5000 particles/m², more preferably 200 to 2000 particles/m².

Further, the hard coat layer may be incorporated with inorganic fine particles with a purpose of adjusting the refractive index and enhancing cured hardness of the film. Inorganic fine particles have preferably an average particle size of 0.5 μm or less, and especially preferably 0.2 μm or less.

Examples of the inorganic fine particles include silicon dioxide particles, titanium dioxide particles, aluminum oxide particles, tin oxide particles, calcium carbonate particles, barium sulfate particles, talc, kaolin and calcium sulfate particles. Especially preferable are silicon dioxide particles, titanium dioxide particles and aluminum oxide particles.

An amount of the inorganic fine particles to be incorporated is preferably 10 to 90% by weight, more preferably 20 to 80% by weight, and especially preferably 30 to 60% by weight of the total mass of the hard coat layer.

A thickness of the hard coat layer is preferably 0.5 to 15 μm, more preferably 1 to 10 μm, and furthermore preferably 1 to 8 μm.

Examples of the compound which can be used to form the low-refractive-index layer include fluorine-containing macromolecular compounds and silicon compounds substituted with an organic substituent, represented by the general formula shown below. Among them, fluorine-containing compounds are preferred. Particularly preferred are fluorine-containing macromolecular compounds which can be crosslinked by heat or ionization radiation. Among them, especially preferably used are fluorine-containing compounds which have a refractive index of 1.45 or less, more preferably a lower refractive index than that of the transparent support used, further more preferably 1.42 or less, and also have a coefficient of kinetic friction of 0.15 or less, and which can be cross-linked by heat or ionization radiation. To regulate coating property, a degree of film hardening and the like, they may be used with another compound in combination. Examples of the cross-linkable fluorine-containing compound include fluorine-containing monomers and cross-linkable fluorine-containing polymers. Among them, it is preferable from the viewpoint of coating property to use the cross-linkable fluorine-containing polymers.

Examples of these cross-linkable fluorine-containing macromolecular compound include perfluoroalkyl group-containing silane compounds (for example, (heptadecafluoro-1,1,2,2-tetradecyl)triethoxysilane), as well as fluorine-containing copolymers composed of a fluorine-containing monomer and another monomer for providing a cross-linkable group, as constitutional units.

Specific examples of the fluorine-containing monomer unit include, for example, fluoroolefins (for example, fluoroethylene, vinylidene fluoride, tetrafluoroethylene, hexafluoroethylene, hexafluoropropylene, perfluoro-2,2-dimethyl-1,3-dioxole, etc.), a partially or completely fluorinated alkyl ester derivative of (meth)acrylic acid (for example, Biscoat 6FM (trade name, manufactured by Osaka Yukikagaku KK) and M-2020 (trade name, manufactured by Daikin KK)), and a partially or completely fluorinated vinyl ethers.

Examples of the monomer imparting a crosslinkable group include, in addition to a (meth)acrylate monomer having previously a cross-lining function in the molecule thereof such as glycidyl methacrylate, a (meth)acrylate monomer having carboxyl group, hydroxyl group, amino group or sulfonic acid group (for example, (meth)acrylic acid, methylol (meth)acrylate, hydroxyalkyl (meth)acrylate, allyl acrylate, etc.). The latter mentioned monomer is known in JP-A-10-25388 and JP-A-10-147739 as a monomer capable of introducing a crosslinking structure after copolymerization. Compounds other than these may additionally be used.

An example is a compound represented by the following formula or a hydrolysis product thereof:

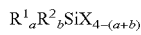

$$R^1{}_a R^2{}_b SiX_{4-(a+b)}$$

wherein $R^1$ and $R^2$ each represent an alkyl group, an alkenyl group, an aryl group, or a hydrocarbon group having a halogen atom, an epoxy group, an amino group, a mercapto group, a methacryloxy group or a cyano group, X represents a hydrolysable substituent selected from an alkoxyl group, an alkoxyalkoxyl group, a halogen atom or an acyloxy group, a and b each are 0, 1 or 2 and a+b is 1 or 2.

As disclosed in JP-A-9-288201, a low-refractive-index layer can be formed by homogeneously containing aerial or vacuum microvoids having a size equal to or smaller than wavelength of light in the layer.

It is preferable for providing scratch resistance that the low-refractive-index layer has a coefficient of kinetic friction of 0.20 or less. If the coefficient of kinetic friction is too large, the performance of scratch resistance is inferior, because hardness is low. For example, at the time when a film is processed to form a polarizing plate, sometimes scratch occurs, which may result in unevenness of display.

Examples of the fluorine-containing macromolecular compound for use in the low-refractive-index layer include polymers which are formed by polymerizing a fluorine-containing monomer. Specific examples of these monomer unites include fluoro olefins (e.g., fluoroethylene, vinylidenefluoride, tetrafluoroethylene, hexafluoroethylene, hexafluoropropylene, perfluoro-2,2-dimethyl-1,3-dioxonol), partially or completely fluorinated alkyl ester derivatives of (meth)acrylic acid, and partially or completely fluorinated vinyl ethers. Among these, one monomer or a plurality of monomers are selected and combined with each other in an optional proportion for copolymerization. In this way, desired polymers can be obtained.

Further, not only polymers of the above-described fluorine-containing monomers as a constitutional unit, but also other copolymers of the above-described fluorine-containing monomers and fluorine-free monomers, may be used. No particular limitation exists in utilizable monomer units. For example, mention can be made of olefins (e.g. ethylene, propylene, isoprene, vinyl chloride, vinylidene chloride), esters of acrylic acid (methyl acrylate, ethyl acrylate, 2-ethylhexyl acrylate), esters of methacrylic acid (e.g. methyl methacrylate, ethyl methacrylate, butyl methacrylate, ethylene glycol dimethacrylate), styrene derivatives (e.g. styrene, divinylbenzene, vinyltoluene, α-methylstyrene), vinyl ethers (e.g. methyl vinyl ether), vinyl esters (e.g. vinyl acetate, vinyl propionate, vinyl cinnamate), acrylamides (e.g. N-tert-butylacrylamide, N-cyclohexylacrylamide), methacrylamides and acrylonitrile derivatives.

The refractive index of the low-refractive-index layer is 1.45 or less, which is lower than that of a transparent support. Further, it is preferable that the refractive index of the low-refractive-index layer is lower than that of the substrate which is used to be coated by the low-refractive-index layer thereon. The refractive index can be measured by the following method.

(Measurement of Refractive Index)

The refractive index of the low-refractive-index layer after hardening, is determined by the following steps:

On a polyethylene terephthalate film exhibiting the refractive index of 1.66, a low-refractive-index layer having a thickness of 0.1 μm is formed and hardened. Then, a spectral refrectance of the formed low-refractive-index layer at an incidence of 5° in the range of 380 nm to 780 nm is measured by means of a spectrophotometer. The refractive index is determined by the minimum value of the obtained reflectances.

Each layer of the film having a high transmittance and matt property can be formed by applying the materials according to the dip coating method, the air-knife coating method, the curtain coating method, the roller coating method, the wire bar coating method, the gravure coating method and the extrusion coat method (U.S. Pat. No. 2,681,294). Two or more layers may be coated at the same time. A means for coating layers at the same time is disclosed in U.S. Pat. Nos. 2,761,791, 2,941,898, 3,508,947 and 3,526,528 and a Japanese book entitled "Kotingu Kogaku (Coating Technology)" written by Yuji Harazaki, p. 253, published by Asakura Shoten (1973).

Figure 2:
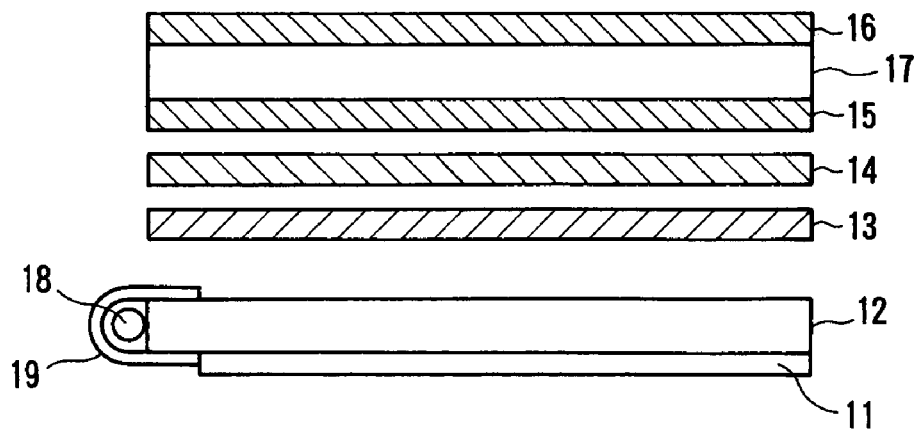
FIG. 2 is a side view diagrammatically showing an example of a conventional liquid crystal display device.

The film having a high transmittance and matt property of the present invention can be used in a liquid crystal display device. However, the liquid crystal display device is not limited to one shown in the foregoing FIG. 2. The film of the present invention can also be used in liquid crystal display devices of various other embodiments. The liquid crystal display device of the present invention may be, for example, an embodiment in which the layer of the film having a high transmittance and matt property of the present invention is formed with the liquid crystal display device in one united body.

It is preferable that the film having a high transmittance and matt property is adhered to a polarizing plate by means of an adhesive so that the transparent support side of the film contacts with the polarizing plate, or alternatively the film having a high transmittance and matt property is used as at least one of two protective films for a polarizing layer of the polarizing plate so that a matted layer is disposed at the side opposite to the polarizing layer. In the liquid crystal display device, such a polarizing plate having a high transmittance and matt property can be generally used as a back light side polarizing plate among two polarizing plates which are disposed at both sides of a liquid crystal cell, and the above-mentioned matted layer is disposed toward the back light side The films having matt property of the present invention according to claims 1 to 7 are of high transmittance and can be used in the polarizing plate of a liquid crystal display device, thereby occurrence of both unevenness of display due to thermal expansion of the light-tuning film and unevenness of brightness can be prevented. Further, the films having a high transmittance of the present invention are excellent in scratch resistance in addition to the above-mentioned characteristics, and therefore they provide the advantage that no scratch occurs on the light-tuning film.

Further, the polarizing plate having high matt property of the present invention according to claim 8 has high brightness, and it is excellent in scratch resistance in addition to the above-mentioned characteristics, and therefore they exhibit the advantage that no scratch occurs on the light-tuning film.

Accordingly, the liquid crystal display device according to claim 9 or 10 provides a stable high quality of display.

The present invention will be explained in more detail by way of the following examples, but the present invention is not limited to these examples.

EXAMPLES (Preparation of a Coating Solution A for a Hard Coat Layer)

In a mixed solvent of 78.8 g of isopropanol, 157.2 g of methyl isobutyl ketone and 102.1 g of methanol was dissolved 256.5 g of a mixture of dipentaerythritol pentaacrylate and dipentaerithritol hexaacrylate (DPHA (trade name, manufactured by Nihon Kayaku KK)). To the resultant solution was added 5.4 g of a photopolymerization initiator (Irgacure 907 (trade name, manufactured by Ciba-Geigy Co.)). The resultant mixture was stirred to dissolve the initiator, and it was filtered through a filter made of polypropylene having a pore diameter of 1 μm. Further, to the filtrate, was added 1.3 g of cross-linking acrylic particles having an average particle size of 5.0 μm and a coefficient of variation of 0.1 (MX-500H, trade name, manufactured by Soken Chemical & Engineering Co., Ltd.), and it was stirred, to prepare a coating solution A for a hard coat layer.

(Preparation of a Coating Solution B for a Hard Coat Layer)

To a mixed solvent of 673.3 g of isopropanol and 146.7 g of methyl isobutyl ketone, a UV-cross-linkable hard coat material (KZ-7874, trade name, manufactured by JSR KK) was added. The resultant mixture was stirred and then it was filtered through a polypropylene filter having a pore diameter of 1 μm. Further, to the filtrate 1.3 g of cross-linking acrylic particles having an average particle size of 5.0 μm and a coefficient of variation of 0.1 (MX-500H, trade name, manufactured by Soken Chemical & Engineering Co., Ltd.) and 1.3 g of cross-liking acrylic particles having an average particle size of 3.0 μm and a coefficient of variation of 0.1 (MX-300H, trade name, manufactured by Soken Chemical & Engineering Co., Ltd.) were added, and they were stirred, to prepare a coating solution B for a hard coat layer.

(Preparation of a Coating Solution C for a Hard Coat Layer)

In a mixed solvent of 78.8 g of isopropanol, 157.2 g of methyl isobutyl ketone and 102.1 g of methanol, was dissolved 256.5 g of a mixture of dipentaerythritol pentaacrylate and dipentaerithritol hexaacrylate (DPHA, manufactured by Nihon Kayaku KK). To the resultant solution was added 5.4 g of a photopolymerization initiator (Irgacure 907, manufactured by Ciba-Geigy Co.). The resultant mixture was stirred to dissolve the initiator, and it was filtered through a filter made of polypropylene having a pore diameter of 1 μm. Further, to the filtrate, 2.6 g of polydispersed melamine-resin particles having an average particle size of 3.0 μm (Epostar MS, trade name, manufactured by Nihon Shokubai KK) was added, and it was stirred, to prepare a coating solution C for a hard coat layer.

(Preparation of a Coating Solution D for a Hard Coat Layer)

In a mixed solvent of 127.2 g of isopropanol and 210.9 g of methanol, was dissolved 256.5 g of a urethane acrylate oligomer (UV-6300B, trade name, manufactured by Nihon Gosei Kagaku KK). To the resultant solution, was added 5.4 g of a photopolymerization initiator (Irgacure 907, manufactured by Ciba-Geigy Co.). The resultant mixture was stirred to dissolve the initiator, and it was filtered through a filter made of polypropylene having a pore diameter of 1 μm. Further, to the filtrate, 1.3 g of cross-linking styrene particles having an average particle size of 5.0 μm and a coefficient of variation of 0.1 (SX-507H, trade name, manufactured by Soken Chemical & Engineering Co., Ltd.) was added, and it was stirred, to prepare a coating solution D for a hard coat layer.

(Preparation of a Coating Solution E for a Hard Coat Layer)

In a mixed solvent of 78.8 g of isopropanol, 157.2 g of methyl isobutyl ketone and 102.1 g of methanol, was dissolved 256.5 g of a mixture of dipentaerythritol pentaacrylate and dipentaerithritol hexaacrylate (DPHA, manufactured by Nihon Kayaku KK). To the resultant solution was added 5.4 g of a photopolymerization initiator (Irgacure 907, manufactured by Ciba-Geigy Co.). The reluctant mixture was stirred to dissolve the initiator, and it was filtered through a filter made of polypropylene having a pore diameter of 1 μm, to prepare a coating solution E for a hard coat layer.

(Preparation of a Coating Solution F for a Hard Coat Layer)

In a mixed solvent of 78.8 g of isopropanol, 157.2 g of methyl isobutyl ketone and 102.1 g of methanol, was dissolved 256.5 g of a mixture of dipentaerythritol pentaacrylate and dipentaerithritol hexaacrylate (DPHA, manufactured by Nihon Kayaku KK). To the resultant solution was added 5.4 g of a photopolymerization initiator (Irgacure 907, manufactured by Ciba-Geigy Co.). The resultant mixture was stirred to dissolve the initiator, and it was filtered through a filter made of polypropylene having a pore diameter of 1 μm. Further, to the filtrate was added 10.0 g of silica particles (Siho-star KE-P50, trade name, manufactured by Nihon Shokubai KK) having an average particle diameter of 0.5 μm, and then it was stirred, to prepare a coating solution F for a hard coat layer.

(Preparation of a Coating Solution G for a Hard Coat Layer)

In a mixed solvent of 78.8 g of isopropanol, 157.2 g of methyl isobutyl ketone and 102.1 g of methanol, was dissolved 256.5 g of a mixture of dipentaerythritol pentaacrylate and dipentaerithritol hexaacrylate (DPHA, manufactured by Nihon Kayaku KK). To the resultant solution was added 5.4 g of a photopolymerization initiator (Irgacure 907, manufactured by Ciba-Geigy Co.). The resultant mixture was stirred to dissolve the initiator, and it was filtered through a filter made of polypropylene having a pore diameter of 1 μm. Further, to the filtrate was added 10 g of amorphous silica particles (Mizukasil P-526: trade name, manufactured by Mizusawa Kagaku KK) having an average particle diameter of 3 μm, and then it was stirred and dispersed by high-speed disperser at 5000 rpm for 1 hour, and it was filtered through a filter made of polypropylene having a pore diameter of 30 μm, to prepare a coating solution G for a hard coat layer.

(Preparation of a Coating Solution H for a Hard Coat Layer)

In a mixed solvent of 78.8 g of isopropanol, 157.2 g of methyl isobutyl ketone and 102.1 g of methanol, was dissolved 256.5 g of a mixture of dipentaerythritol pentaacrylate and dipentaerithritol hexaacrylate (DPHA, manufactured by Nihon Kayaku KK). To the resultant solution was added 5.4 g of a photopolymerization initiator (Irgacure 907, manufactured by Ciba-Geigy Co.). The resultant mixture was stirred to dissolve the initiator, and it was filtered through a filter made of polypropylene having a pore diameter of 1 μm. Further, to the filtrate was added 20.0 g of silica particles (Siho-star KE-P150, manufactured by Nihon Shokubai KK) having an average particle diameter of 1.5 μm, and then it was stirred, to prepare a coating solution H for a hard coat layer.

(Preparation of a Coating Solution A for a Low-Refractive-Index Layer)

To 200 g of a thermo-cross-linkable fluorine-containing polymer (JN-7219, trade name, manufactured by JSR KK) was added 200 g of methyl isobutyl ketone. The resultant mixture was stirred, and it was filtered through a filter made of polypropylene having a pore diameter of 1 μm, to prepare a coating solution for a low-refractive-index layer.

Example 1

The aforesaid coating solution C for a hard coat layer was coated onto a triacetylcellulose film (TAC-TD80U, trade name, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer, to form a hard coat layer having a thickness of 2 μm.

Then, the aforesaid coating solution A for a low-refractive-index layer was coated onto the hard coat layer, using a bar coater, and it was dried at 80° C. and heated at 120° C. for 10 minutes to effect thermal crosslinking, to form a low-refractive-index layer having a thickness of 0.096 μm.

Example 2

The aforesaid coating solution D for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer, using a bar coater, and it was dried at 80° C. and heated at 120° C. for 10 minutes to effect thermal crosslinking, to form a low-refractive-index layer having a thickness of 0.096 μm.

Comparative Example 1

The aforesaid coating solution A for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Comparative Example 2

The aforesaid coating solution B for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Comparative Example 3

The aforesaid coating solution E for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer by cross-linking, to form a hard coat layer having a thickness of 3 μm.

Comparative Example 4

The aforesaid coating liquid E for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer, using a bar coater, and it was dried at 80° C. and heated at 120° C. for 10 minutes to effect thermal crosslinking, to form a low-refractive-index layer having a thickness of 0.096 μm.

Comparative Example 5

The aforesaid coating solution F for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer using a bar coater, and it was dried at 80° C. and heated at 120° C. for 10 minutes to effect thermal crosslinking, to form a low-refractive-index layer having a thickness of 0.096 μm.

Example 3

The aforesaid coating solution G for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer using a bar coater, and it was dried at 80° C. and heated at 120° C. for 10 minutes to effect thermal crosslinking, to form a low-refractive-index layer having a thickness of 0.096 μm.

(Evaluation of the Film having a High Transmittance and Matt Property)

As for the resultant films, the following items were evaluated:

(1) Total Light Transmittance and Haze

Total light transmittance and haze of the resultant films were measured using a haze meter MODEL 1001DP (trade name, manufactured by Nihon Denshoku Kogyo KK).

(2) Evaluation of Pencil Hardness

Evaluation of pencil hardness disclosed in JIS K 5400 was carried out, as an index of scratch-resistance. After humidification of the anti-reflection film at temperature of 25° C. and humidity of 60% RH for two hours, scratch tests were carried out under the load condition of 1 kg using test pencils of H and 2H grades, as defined in JIS S 6006. Then, evaluation was conducted according to the following criteria:

In the evaluation of n=5, no scratch was detected: ○
In the evaluation of n=5, 1 or 2 scratch marks were detected: Δ
In the evaluation of n=5, at least 3 scratch marks were detected: X (3) Measurement of Kinetic Friction Coefficient The kinetic friction coefficient was evaluated as an index of surface-sliding property. The resultant films each were adjusted in humidity at 25° C. and a relative humidity of 60% for 2 hours, and then was carried out measurement by a HEIDON-14 kinetic friction tester, using a stainless steel ball having a diameter of 5 mmφ, under a load of 100 g, at a velocity of 60 cm/min. The resultant measured value was used as a kinetic friction coefficient.

(4) Evaluation of Matt Property

As an index of matt property, a 4×5 cm slide glass was placed on the matted layer of the thus-prepared film, and a weight of 1 kg was overlaid on the glass, to determine the state of non-uniformity in ring shape due to contact, according to the following evaluations. The matt property corresponds to the ability to prevent both unevenness in display and unevenness in brightness:

Non-uniformity was utterly not recognized: ○
Slight non-uniformity was recognized in small areas: Δ
Generation of non-uniformity in all areas was recognized: X (5) Refractive Index The refractive index of the low-refractive-index layer after curing, was determined by the following steps. Namely, on a polyethylene terephthalate film exhibiting the refractive index of 1.66, the low-refractive-index layer having a thickness of 0.1 μm was formed and cured according to the above-mentioned method. Then, a spectral reflectance of the resultant low-refractive-index layer at an incidence of 5° in the range of 380 nm to 780 nm was measured by means of a spectrophotometer. The refractive index was determined by the minimum value of the obtained reflectance. In the Examples and the Comparative Examples, each using a low-refractive-index layer, the refractive index thereof was 1.42 or less respectively. This value was lower than the refractive index of the transparent support to be used.

The results which were obtained in these Examples and Comparative Examples, are shown in Table 1.

The films in Examples 1 and 2 each exhibited the haze value of 1.0% or more, but the total transmittance of light exceeding 93.5%. Further, each of them exhibited the pencil hardness of 2H or harder degree and coefficient of kinetic friction of 0.10, and they were excellent in matt property.

With respect to Comparative Examples 1 and 2, in which the particles were incorporated in the hard coat layer, matt property was improved much more than that of Comparative Example 3 which was free of the particles. However, as to the Comparative Examples 1 and 2, in which the low-refractive-index layer was omitted, the total transmittance of light was as low as 92.4% and 92.1%, respectively.

With respect to Comparative Example 4, no matt property was obtained for non-addition of the particles. Also with respect to Comparative Example 5, the matt property was not enough because the particles used were small in particle diameter.

Example 3 was an example which used silica particles exhibiting a high Mohs' scale of hardness. The film in Example 3 had the haze value as high as 5.8%, but exhibited the total transmittance of light of 93.5% which is a minimum goal. Further, the film had a pencil hardness of 2H or more and a coefficient of kinetic friction of 0.10, and was excellent in matt property.

TABLE 1

| | Haze (%) | Total light transmittance (%) | Pencil hardness H | Pencil hardness 2H | Kinetic friction coefficient (−) | Matt property |
|---|---|---|---|---|---|---|
| Example 1 | 3.3 | 94.2 | ○ | ○ | 0.10 | ○ |
| Example 2 | 1.8 | 93.8 | ○ | ○ | 0.10 | ○ |
| Comparative Example 1 | 1.2 | 92.4 | ○ | ○ | 0.55 | ○ |
| Comparative Example 2 | 3.8 | 92.1 | ○ | ○ | 0.53 | ○ |
| Comparative Example 3 | 0.0 | 92.2 | ○ | ○ | 0.57 | X |
| Comparative Example 4 | 0.0 | 94.0 | ○ | ○ | 0.10 | X |
| Comparative Example 5 | 1.8 | 94.0 | ○ | ○ | 0.10 | Δ |
| Example 3 | 5.8 | 93.5 | ○ | ○ | 0.10 | ○ |

Example 4

The aforesaid coating solution A for a hard coat layer was coated onto a triacetylcellulose film (TAC-TD80U, trade name, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer using a bar coater, and it was dried at 80° C. and heated at 120° C. for 10 minutes to effect thermal crosslinking, to form a low-refractive-index layer having a thickness of 0.096 μm.

Example 5

The aforesaid coating solution B for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer using a bar coater, and it was dried at 80° C. and heated at 120° C. for 10 minutes to effect thermal crosslinking, to form a low-refractive-index layer having a thickness of 0.096 μm.

Comparative Example 6

The aforesaid coating solution H for a hard coat layer was coated onto a triacetylcellulose film (TAC-TD80U, manufactured by Fuji Photo Film Co., Ltd.) having a thickness of 80 μm, using a bar coater, and the resultant film was dried at 120° C. and then irradiated with UV-rays at an irradiation dose of 300 mJ/cm$^2$ and an illuminance of 400 mW/cm$^2$, using a 160 W/cm air-cooled metal halide lamp (manufactured by Ai Graphics KK), to cure the coated layer to form a hard coat layer having a thickness of 3 μm.

Then, the aforesaid coating solution A for a low-refractive-index layer was coated onto the hard coat layer using a bar coater, and it was dried at 80° C. and heated at 120° C. for 10 minutes to effect thermal crosslinking, to form a low-refractive-index layer having a thickness of 0.096 μm.

(Evaluation of the Film having a High Transmittance and Matt Property)

As for the thus-prepared films, the following items were evaluated:

(1) Total light transmittance and haze (2) Evaluation of pencil hardness (3) Measurement of kinetic friction coefficient (4) Evaluation of matt property (5) Refractive Index With regard to (1) to (5), tests and evaluation were carried out in the same manner as mentioned above. The refractive index of the low-refractive-index layer was 1.42.

(6) Evaluation of Scratch-Preventing Property

As an index of scratch-preventing property, the prepared film was mounted onto a stainless steel panel having a size of 20×75 mm and a weight of 500 g so that the matted surface would become an external side thereof. This panel was placed on a polyethylene terephthalate film so as to face the matted surface downward and then the stainless steel panel was pushed and pulled at a rate of 20 mm/min. Scratch mark thus formed on the polyethylene terephthalate film was evaluated as follows:

No scratch was detected: ○
Scratch was detected partially in the test area: Δ
Scratch was detected wholly in the test area: X
The results obtained are shown in Table 2.

Even though the films in Examples 4 and 5 each had the haze value of 1.0% or more, they exhibited the total transmittance of light of more than 93.5%. Further, they each had a pencil hardness of 2H or harder and a coefficient of kinetic friction of 0.10, and were excellent in both matt property and scratch resistance.

On the other hand, the film in Comparative Example 6 was inferior in scratch resistance because silica particles exhibiting a high Mohs' scale of hardness were used, and also the matt property was not enough because the silica particles to be used were of small particle diameter.

TABLE 2

| | Haze (%) | Total light transmittance (%) | Pencil hardness H | Pencil hardness 2H | Kinetic friction coefficient (−) | Matt property | Scratch resistance |
|---|---|---|---|---|---|---|---|
| Example 4 | 1.2 | 94.2 | ○ | ○ | 0.10 | ○ | ○ |
| Example 5 | 3.4 | 94.0 | ○ | ○ | 0.10 | ○ | ○ |
| Comparative Example 6 | 1.8 | 94.0 | ○ | ○ | 0.10 | Δ | X |

Further, a polarizing plate having a high transmittance and matt property was prepared using the film of Example 5. Further, a liquid crystal display device was produced, using the foregoing film, as a back light side polarizing plate among two polarizing plates that were disposed on both sides of a liquid crystal cell, the above-mentioned matted layer being arranged toward the direction of the back light side. As a result, in the liquid crystal display device, the brightness in the white display increased by 2%, compared to that of the display device which did not use the foregoing film. In the liquid crystal display device of the invention, reduction in display quality due to the unevenness was not observed even after 7 days, in both environments of a room temperature and a high temperature elevated to 60° C. Also in the films of Examples 3 and 4, the same results (properties) as above were obtained. When the film of Comparative Example 1 was used, reduction in display quality due to the unevenness was not observed, but the device failed to improve brightness. When the films of Comparative Examples 4 and 5 were used, the brightness increased by the range of 1 to 2% but they failed to prevent the display quality from being deteriorated due to the unevenness. Further, it is assumed that since the films of Examples 1 and 2 also provided the similar results as those of Examples 3 to 5 in the contact angle and glass contact tests, these films would also exhibit the similar results as the above, in the mounting test.

INDUSTRIAL APPLICABILITY

The films having matt property of the present invention are of high transmittance, and are able to prevent occurrence of unevenness in brightness and unevenness in display due to thermal expansion of a light-tuning film that is used in a liquid crystal display device. Therefore, the films are preferable for use in the polarizing plate of a liquid crystal display device. Further, the films having a high transmittance of the present invention are especially preferable for use in the polarizing plate of a liquid crystal display device, because the specific low-refractive-index layer that would be provided in each of the film, provides an excellent scratch resistance in addition to the above-mentioned characteristics, and the films do not cause a scratch on a light-tuning film.

Further, the polarizing plates having matt property of the present invention are preferable as a polarizing plate of a liquid crystal display device, because they exhibit a high brightness and provide an excellent scratch resistance in addition to the above-mentioned characteristics, and they do not cause a scratch on a light-tuning film.

Accordingly, the liquid crystal display device of the present invention shows a suitable high display quality.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A film in a display device, having a high transmittance and matt property, comprising, on a transparent support,
   (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and
   (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation,
   wherein the film shows a haze value of 1.0% or more, and a total transmittance of light of 93.5% or more,
   whereby occurrence of non-uniformity of brightness due to light interference is prevented by virtue of the high transmittance and matt property of the film, when the concavo-convex structure of a surface of the film is contacted with a smooth surface of a layer in a display device.

2. The film in a display device, having a high transmittance and matt property according to claim 1, wherein the particles are monodispersed transparent fine particles formed from a resin having a Moh's scale of hardness of less than 7.

3. The film in a display device, having a high transmittance and matt property according to claim 1, wherein the particles are monodispersed transparent fine particles formed from a resin having a Moh's scale of hardness of less than 7, and wherein said low-refractive-index layer has a coefficient of kinetic friction of 0.15 or less.

4. The film in a display device, having a high transmittance and matt property according to claim 1, wherein an average particle diameter of the particles is larger than the thickness of the hard coat layer by 0.5 to 5.0 μm.

5. The film in a display device, having a high transmittance and matt property according to claim 1, wherein the density of the particles is in a range of 200 to 2000 particles/m$^2$.

6. The film in a display device, having a high transmittance and matt property according to claim 1, wherein the low-refractive-index layer has a coefficient of kinetic friction of 0.15 or less.

7. The film in a display device, having a high transmittance and matt property according to claim 1, wherein said film is provided on at least one side of a polarizing layer to form a polarizing plate of the display device, and wherein the concavo-convex structure of a surface of the film is disposed at the side opposite to the polarizing layer, whereby occurrence of non-uniformity of brightness due to light interference is prevented by virtue of the high transmittance and matt property of the film, when the concavo-convex structure of a surface of the polarizing plate is brought into contact with a smooth surface of a layer of the display device.

8. A polarizing plate in a display device, having a high transmittance and matt property, comprising a polarizing layer and two protective films thereon, wherein at least one of the protective films is a film having a high transmittance and matt property, wherein a matted layer is disposed at the opposite side to the polarizing layer, wherein:
   the film having a high transmittance and matt property comprises, on a transparent support,
   (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and
   (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation,
   wherein the film shows a haze value of 1.0% or more, and a total transmittance of light of 93.5% or more,
   whereby occurrence of non-uniformity of brightness due to light interference is prevented by virtue of the high transmittance and matt property of the film, when the concavo-convex structure of a surface of the film is contacted with a smooth surface of a layer in a display device; or
   the film having a high transmittance and matt property comprises, on a transparent support,
   (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and
   (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation,
   wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device, wherein the particles are monodispersed transparent fine particles formed from a resin having a Moh's scale of hardness of less than 7; or the film having a high transmittance and matt property comprises on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device, wherein the particles are monodispersed transparent fine particles formed from a resin having a Moh's scale of hardness of less than 7, and wherein said low-refractive-index layer has a coefficient of kinetic friction of 0.15 or less.

9. A liquid crystal display device, comprising the film having a high transmittance and matt property, wherein:

the film having a high transmittance and matt property comprises, on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m $^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device; or the film having a high transmittance and matt property comprises, on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device, wherein the particles are monodispersed transparent fine particles formed from a resin having a Moh's scale of hardness of less than 7; or the film having a high transmittance and matt property comprises, on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device, wherein the particles are monodispersed transparent fine particles formed from a resin having a Moh's scale of hardness of less than 7, and wherein said low-refractive-index layer has a coefficient of kinetic friction of 0.15 or less.

10. A liquid crystal display device, comprising two polarizing plates provided on both sides of a liquid crystal cell, wherein the polarizing plate provided at the back light side is a polarizing plate having a high transmittance and matt property, the matted layer being disposed toward the back light side, wherein the polarizing plate having a high transmittance and matt property comprises a polarizing layer and two protective films thereon, wherein at least one of the protective films is a film having a high transmittance and matt property, wherein a matted layer is disposed at the opposite side to the polarizing layer, wherein:

the film having a high transmittance and matt property comprises, on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device; or the film having a high transmittance and matt property comprises, on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device, wherein the particles are monodispersed transparent fine particles formed from a resin having a Moh's scale of hardness of less than 7; or the film having a high transmittance and matt property comprises, on a transparent support, (a) a hard coat layer comprising a cross-linked binder polymer and particles incorporated therein, wherein the particles have a particle size of from 1.0 to 10 μm that is larger than the thickness of the hard coat layer thereby providing a concavo-convex structure, wherein said particles are set in contact with the transparent support, wherein a density of the particles is in a range of from 100 to 5000 particles/m$^2$, and wherein the particles are monodispersed transparent fine particles having a particle size distribution of 0.2 or less in terms of coefficient of variation, and (b) a low-refractive-index layer having a refractive index of 1.45 or less and a coefficient of kinetic friction of 0.2 or less, wherein the low-refractive-index layer covers said hard coat layer so as to maintain said concavo-convex structure formed by said particles incorporated in the hard coat layer, and wherein said low-refractive-index layer comprises a fluorine-containing macromolecular compound that is cross-linked by heat or ionization radiation, wherein the film shows a haze value of 1.0% or more, and a total transmittance of light of 93.5% or more, whereby occurrence of non-uniformity of brightness due to light interference is prevented by virtue of the high transmittance and matt property of the film, when the concavo-convex structure of a surface of the film is contacted with a smooth surface of a layer in a display device, wherein the particles are monodispersed transparent fine particles formed from a resin having a Moh's scale of hardness of less than 7, and wherein said low-refractive-index layer has a coefficient of kinetic friction of 0.15 or less.

11. The film in a display device, having a high transmittance and matt property according to claim 1, wherein said film is provided on at least one side of a polarizing layer to form a polarizing plate of the display device, and wherein the concavo-convex structure of a surface of the film is disposed at the side opposite to the polarizing layer, wherein said polarizing plate is arranged in the display device such that the concavo-convex structure is disposed toward a back light side, and the polarizing plate is located next to a light tuning film layer, without being bonded to the light tuning film layer, with a slight gap existing therebetween such that the concavo-convex structure occasionally contacts a smooth surface of the light tuning film layer during operation of the display device, whereby occurrence of non-uniformity of brightness due to light interference is prevented by virtue of the high transmittance and matter property of the film, when the concavo-convex structure of a surface of the polarizing plate is brought into contact with the smooth surface of the light tuning film layer that is elongated by heating during operation of the display device.

* * * * *